3,043,842
SUBSTITUTED ACRIDANS
Paul N. Craig, Roslyn, Pa., assignor to Smith Kline & French Laboratories, Philadelphia, Pa., a corporation of Pennsylvania
No Drawing. Filed Feb. 9, 1959, Ser. No. 791,850
8 Claims. (Cl. 260—268)

This invention relates to novel substituted acridans which have useful pharmacological activity.

The substituted acridans of this invention have utility as mild sedative agents and tranquilizers and can be used, for example, to abate mental disturbances, such as anxiety, confusion or physical excitation without any concomitant physical incapacitation. They are also useful as antiemetics. Further, their utility is greatly enhanced by their low toxicities.

The substituted acridans of this invention are represented by the following structure:

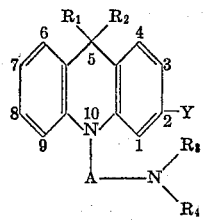

when:
Y represents halogen having an atomic weight of less than 80, preferably chlorine, or trifluoromethyl;
$R_1$ and $R_2$ represent H or lower alkyl such as methyl or ethyl;
A represents a straight or branched alkylene chain of from 3 to 5 carbon atoms with at least 3 carbon atoms separating the two nitrogen atoms; and
$R_3$ and $R_4$ represent lower alkyl groups such as methyl, ethyl or butyl, or divalent groups which, when taken together with the nitrogen, form a monocyclic, five- or six-membered heterocyclic ring, such as piperazinyl, lower alkylpiperazinyl, ω-hydroxy-lower-alkylpiperazinyl, ω-hydroxy-lower-alkoxy - lower - alkylpiperazinyl, ω-acetoxy-lower-alkylpiperazinyl, pyrrolidinyl, morpholinyl, or piperidinyl.

Advantageous compounds of this invention are represented by the following structure:

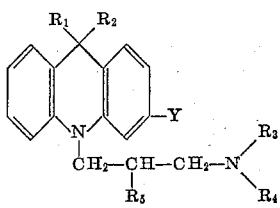

when:
Y represents halogen having an atomic weight of less than 80, preferably chlorine, or trifluoromethyl;
$R_1$ and $R_2$ represent hydrogen or lower alkyl such as methyl or ethyl;
$R_3$ and $R_4$ represent lower alkyl groups such as methyl or ethyl, or divalent groups which, when taken together with the nitrogen, form a monocyclic, five or six-membered heterocyclic ring, such as exemplified above; and
$R_5$ represents hydrogen or methyl.

Preferred compounds of this invention having particular utility as tranquilizing agents are represented by the following structure:

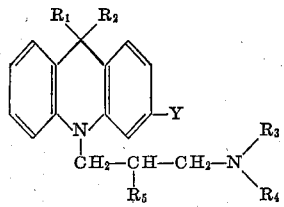

when:
Y represents chlorine or trifluoromethyl;
$R_1$ and $R_2$ represent hydrogen;
$R_3$ and $R_4$ represent methyl, ethyl or a monocyclic, five- or six-membered heterocyclic ring such as exemplified above, when taken together with the nitrogen; and
$R_5$ represents hydrogen or methyl.

Particularly preferred and advantageous compounds of this invention having particular utility as tranquilizing agents are represented by the following structure:

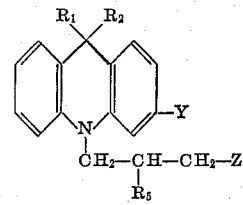

when:
Y represents chlorine or trifluoromethyl;
$R_1$ and $R_2$ represent hydrogen;
$R_5$ represents hydrogen or methyl; and
Z represents dimethylamino, piperazinyl, N-methylpiperazinyl, N-hydroxyethylpiperazinyl, N-hydroxyethoxyethylpiperazinyl or N-acetoxyethylpiperazinyl.

This invention also includes salts of the above defined bases formed with nontoxic pharmaceutically acceptable organic and inorganic acids. Such salts are easily prepared by methods known to the art. The base is reacted with either the calculated amount of organic or inorganic acid in a water-miscible solvent, such as acetone or ethanol, with isolation of the salt by concentration and cooling; or with an excess of the acid in a water-immiscible solvent, such as ethyl acetate, ethyl ether or chloroform with the desired salt separating directly. Exemplary of such organic salts are those with maleic, fumaric, benzoic, ascorbic, pamoic, succinic, bismethylenesalicylic, methylsulfonic, ethanedisulfonic, acetic, propionic, tartaric, salicylic, citric, gluconic, lactic, malic, mandelic, cinnamic, citraconic, aspartic, stearic, palmitic, itaconic, glycolic, glutamic, benzene sulfonic and theophylline acetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

By the terms "lower alkyl" or "lower alkoxy" as used herein, aliphatic groups having 1 to 4 carbon atoms and preferably 1 to 2 carbon atoms are indicated. The term "dialkylamino" as used hereinafter includes heterocyclic groups as defined above.

METHOD OF PREPARATION

The compounds of this invention are prepared using as starting materials the corresponding acridans which are known or readily prepared by following the prior art. For example, where in the above structural formulas $R_2$ is hydrogen and $R_1$ is hydrogen or lower alkyl, the 2-substituted-acridan starting materials are produced by reduction of the known acridine analogue, for example, catalytically in ethanol with Raney nickel catalyst as illustrated below in the complete process:

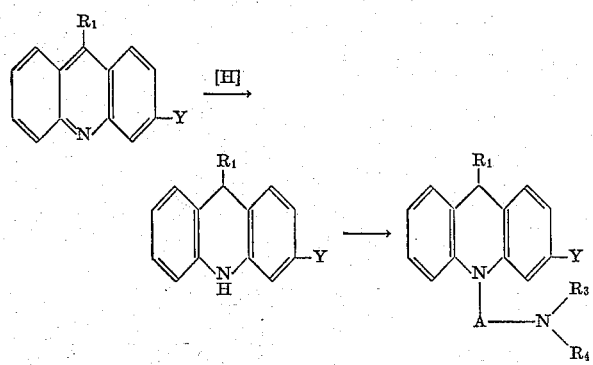

Alternatively, it is often possible to prepare these 2-substituted-acridans by reduction of the 5-chloroacridine analogues which are in turn readily available from reacting the 5-acridones with phosphorus oxychloride. This reduction is, for example, carried out in the presence of alkali, for instance, potassium hydroxide, with Raney nickel at room temperature. This procedure is illustrated below:

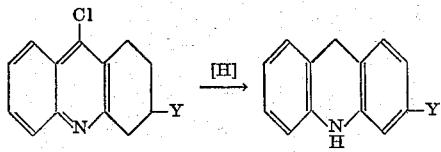

The 5,5-dialkylacridan starting materials are readily prepared by reacting either the 5-alkyl-2-substituted-acridines or the 2-substituted-acridones with a methyl or ethyl Grignard reagent, such as methyl magnesium iodide or ethyl magnesium bromide, preferably at reflux in diethyl ether or in dibutyl ether solution. A mixture of dialkyl-acridan and monoalkylacridine products is obtained but is separated easily either by fractional distillation or recrystallization. This procedure is illustrated below:

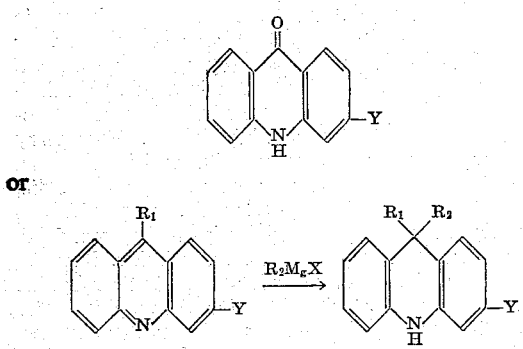

The 2-substituted-acridans which serve as starting materials are alkylated with a reactive dialkylaminoalkyl ester such as a halide, preferably chloride or bromide, or an arylsulfonate, such as P-tosylate or phenylsulfonate in a suitable inert aromatic solvent, such as benzene, xylene or toluene, in which at least one of the reactants must be soluble. A suitable acid-binding agent may be included, such as an alkali metal amide, preferably sodium amide or potassium amide; an alkali metal hydride, preferably sodium hydride; an alkali metal aryl or alkyl compound, preferably phenyl sodium or octyl sodium.

If an acid addition salt of the reactive dialkylaminoalkyl ester is used, a corresponding increase in the amount of acid-binding agent must also be used. The preferred method of alkylation, however, is to react the 2-substituted-acridan with a dialkylaminoalkyl chloride or bromide with a slight excess of sodium or potassium amide in refluxing benzene or tolunene for from 30 minutes to 36 hours, preferably 6 to 24 hours.

The reaction mixture is then cooled and diluted carefully with water. The organic base is either extracted with dilute acid solution and regenerated with base or obtained by direct evaporation of the organic solvent, depending on the expected purity of the product. The resulting basic residue is taken upin an organic solvent and reacted with a suitable organic or inorganic acid to form a crystalline salt which is recrystallized, usually from alcohol-ether. Alternatively, the residual oil is fractionally distilled under high vacuum to give the desired base which is usually a pale yellow oil and which often may be crystallized if desired.

The new compounds of this invention are administered to human beings, usually orally, in combination with a pharmaceutical carrier. The carrier may be a solid or liquid. If a solid carrier is desired, the medicament is mixed with the carrier, such as talc, mannitol, lactose or cornstarch, and filled into a soft gelatin capsule. Alternatively, the mixture of the compound of this invention is mixed with the carrier together with tableting aids, such as starch or magnesium stearate, granulated using sucrose or gelatin solution and tableted. Suitable liquid carriers are the oils, such as peanut oil or vegetable oil, which are mixed with the medicament to form a thick paste and then filled into soft gelatin capsules. Other liquid carriers may be an aqueous suspension, such as in a medium consisting of water, sodium carboxymethylcellulose and a montmorillonite.

The following examples are illustrative of the compounds of this invention and their preparation.

*Example 1*

A mixture of 28.8 g. of 2,5-dichloroacridine and 48.0 g. of sodium bicarbonate in 350 ml. of methanol is heated at 75° C. with stirring and under a stream of carbon dioxide. Sodium amalgam (4%, 320 g.) is added gradually over a two-hour period. The temperature is held at 70–80° C. for several hours and then 150 g. more of amalgam is added. The heating period is extended for several hours. The mixture is filtered hot. The residue is extracted with several portions of hot ethanol. The alcoholic extracts are combined, evaporated and cooled to separate a solid which is washed with water and recrystallized from ethanol. The resulting solid is the desired 2-chloroacridan.

2-chloroacridan is also prepared by hydrogenating 2,5-dichloroacridine (2.0 g.) in 600 ml. of methanol with 0.4 g. of potassium hydroxide and 1.9 g. of nickel slurry for one hour. After removal of the catalyst and a small amount of by-product, the filtrate is evaporated to give the desired 2-chloroacridan, M.P. 117–118° C.

A suspension of 4.3 g. of 2-chloroacridan, 3.8 g. of 3-bromo-1-dimethylaminopropane, and 1.2 g. of potassium amide in 75 ml. of benzene is heated at reflux for five hours. The mixture is cooled and quenched with 50 ml. of water. The organic layer is extrated with hydrochloric acid solution and the acid layers are neutralized with alkali. The base is then obtained by benzene extraction and evaporation of the dried extract.

The crude base, 2.7 g., is taken up in 50 ml. of ethanol-ether mixture. Ethnolic hydrogen chloride (15 ml.) is added and the combined solution is evaporated on the steam bath until bumping begins. The mixture is then diluted with ether, cooled and filtered to give a microcrystalline solid, 2-chloro-10-(3'-dimethylaminopropyl)-acridan hydrochloride.

*Example 2*

A solution of 5.7 g. of potassium hydroxide in 250 ml. of aqueous ethyl alcohol is shaken with a suspension of 28.2 g. of 5-chloro-2-trifluoromethylacridine in 100 ml. of benzene. After the addition of 10.0 g. of Raney nickel catalyst, the solution is shaken in a low pressure hydrogenation apparatus until the absorption of hydrogen has ceased (about four to five hours). The solution is warmed and filtered. The residue is extracted several times with hot ethanol. The filtrates are concentrated and cooled to yield the crystalline product, 2-trifluoromethylacridan.

A suspension of 12.5 g. of 2-trifluoromethylacridan, 9.9 g. of 3-chloro-1-(N-methylpiperazinyl)-propane and 2.0 g. of sodium amide in 300 ml. of dry toluene is heated at reflux for six hours with stirring. The reaction mixture is cooled and carefully quenched with 100 ml. of water. The organic layer is washed with water, dried over potassium hydroxide pellets and evaporated in vacuo. Distillation of the residue under high vacuum gives a high boiling, B.P. 196 to 200° C. at 0.3 mm., syrup which partially crystallizes, 10-[3'-(N-methylpiperazinyl)-propyl]-2-trifluoromethylacridan.

A solution of 2.0 g. of the crystalline base in 50 ml. of ethyl acetate is added to a solution of 1.3 g. of maleic acid in 25 ml. of ethyl alcohol. The resulting mixture is allowed to evaporate on the steam bath and finally cooled in the cold room to a crystalline mass of 10-[3'-(N-methylpiperazinyl) - propyl]-2-trifluoromethylacridan dimaleate.

Example 3

A suspension of 10.7 g. of 2-chloroacridan, 12.0 g. of 5-bromo-1-(N-pyrrolidinyl)-pentane, and 2.0 g. of sodium amide in 150 ml. of benzene is heated at reflux for 24 hours. The cooled mixture is carefully diluted with 25 ml. of water. The organic layer is separated and extracted with dilute hydrochloric acid. The acid extracts are neutralized with sodium carbonate solution and re-extracted with toluene. The extracts, dried over potassium hydroxide pellets, are removed by heating in vacuo to leave a basic residue, 2-chloro-10-(5'-pyrrolidinylpentyl)-acridan.

A solution of 2.0 g. of the base in 50 ml. of ethyl acetate is saturated with dry hydrogen bromide gas. Cooling and filtration gives, after washing with ether, 2-chloro-10-(5'-pyrrolidinylpentyl)-acridan hydrobromide.

Example 4

A suspension of 2.2 g. of 2-chloroacridan, 1.8 g. of 3-chloro-1-(N-piperidyl)-propane and 0.4 g. of sodium amide in 75 ml. of toluene is heated at reflux for eight hours. The reaction mixture is worked up following the procedure of Example 1 to give the basic oil, 2-chloro-10-[3'-(N-piperidyl)-propyl]-acridan.

This base, 2.5 g. in 50 ml. of ether is reacted with hydrogen bromide gas to give crystals of 2-chloro-10-[3'-(N-piperidyl)-propyl]-acridan hydrobromide.

Example 5

A mixture of 21.5 g. of 2-chloroacridan and 4.0 g. of sodium amide in 300 ml. of toluene is heated at reflux for two hours. A mixture of 29.5 g. of N-acetoxy-ethyl-N'-chloropropylpiperazine in 150 ml. of toluene is added portion-wise to the stirred sodioacridan mixture. After the addition, the mixture is heated at reflux for six hours, then diluted carefully with 100 ml. of water. The organic layer is separated, dried and evaporated in vacuo. The basic residue is taken up in isopropanol and acidified with ethanolic hydrogen chloride. The solution is evaporated at the water pump until a solid begins to separate. Cooling overnight in the cold room gives 2-chloro-10-[3'-(4''-acetoxyethyl-1''-piperazinyl)-propyl]-acridan dihydrochloride.

The free base from above (3.0 g.) is refluxed in 25 ml. of hydrochloric acid. The acid solution is diluted to 100 ml. with water, filtered and carefully neutralized with sodium carbonate. The resulting slurry is extracted with both benzene and ethyl ether. The combined extracts are dried and evaporated in vacuo to give 2-chloro-10-[3'-(4''-hydroxyethyl-1''-piperazinyl)-propyl]-acridan.

Example 6

A mixture of 24.9 g. of 2-trifluoromethylacridan and 4.0 g. of sodium amide in 250 ml. of benzene is reacted with 30.0 g. of N-acetoxyethyl-N'-chloropropylpiperazine in 100 ml. of benzene following the procedure in Example 5 to give 10-[3'-(4''-acetoxyethyl-1''-piperazinyl)-propyl]-2-trifluoromethylacridan as the free base.

The base (3.8 g.) is heated at reflux in 25 ml. of hydrochloric acid. The acid solution is diluted to 100 ml. with water, filtered and carefully neutralized with sodium carbonate. The resulting slurry is extracted exhaustively with both benzene and ethyl ether. The extracts are combined, dried and evaporated. The resulting base, 10-[3'-(4''-hydroxyethyl-1''-piperazinyl) - propyl] - 2 - trifluoromethylacridan, is then converted into the dimaleate by treatment with an excess of maleic acid in an ethyl acetate-acetone mixture.

Example 7

A solution of 26.3 g. of 2-trifluoromethylacridone in 200 ml. of butyl ether is added carefully to a boiling mixture of about 35 g. of methyl magnesium bromide in 200 ml. of butyl ether at 90–100° C. with stirring in a large flask. After the initial reaction, the mixture is allowed to heat at reflux for several hours with a magnetic stirrer. The cooled mixture is added to 500 ml. of water, acidified with 40 ml. of acetic acid and the ether layer separates. Distillation of the residue therefrom gives a high-boiling oil which solidifies to a crystalline solid at room temperature, 5,5-dimethyl-2-trifluoromethylacridan.

A mixture of 2.7 g. of 5,5-dimethyl-2-trifluoromethylacridan, 1.5 g. of 3-chloro-1-dimethylamino-2-methylpropane, and 0.5 g. of sodium amide in 75 ml. of benzene is heated at reflux for ten hours. After working up as in Example 1 and reacting the crude base with maleic acid in ether-acetone, the maleate salt of 5,5-dimethyl-10-(3'-dimethylamino-2'-methylpropyl) - 2 - trifluoromethylacridan is recovered.

Example 8

A mixture of 5.0 g. of 2-trifluoromethylacridan, 3.0 g. of 3-chloro-1-dimethylamino-2-methylpropane, and 0.9 g. of sodium amide in 150 ml. of benzene is heated at reflux for ten hours. After working up as in Example 1 and reacting the crude base with maleic acid in ether-acetone, the maleate salt of 10-(3'-dimethylamino-2'-methylpropyl)-2-trifluoromethylacridan is recovered.

Example 9

A mixture of 6.0 g. of 5,5-diethyl-2-trifluoromethylacridan, prepared from 2-trifluoromethylacridone and ethyl Grignard reagent as described in Example 7, 4.1 g. of 3-chloro-1-(N-morpholinyl)-propane hydrochloride and 1.0 g. of sodium amide in 50 ml. of xylene is heated at reflux for eight hours. After working up as in Example 1, the base, 5,5-diethyl-10-[3'(N-morpholinyl)-propyl]-2-trifluoromethylacridan, is dissolved in 100 ml. of ether-ethyl acetate mixture and reacted with an excess of a saturated citric acid in ether solution to give the citrate salt.

Example 10

A mixture of 2.5 g. of 2-trifluoromethylacridan, 1.5 g. of 3-chloro-1-(N-morpholinyl)-propane hydrochloride and 0.4 g. of sodium amide in 50 ml. of xylene is heated at reflux for eight hours. After working up as in Example 1, the base, 10-[3'-(N-morpholinyl)-propyl]-2-trifluoromethylacridan, is dissolved in 100 ml. of ether-ethyl acetate mixture and reacted with an excess of a saturated citric acid in either solution to give the citrate salt.

Example 11

A suspension of 2.2 g. of 2-chloroacridan, 1.6 g. of 3-chloro-1-diethylaminopropane and 0.5 g. of sodium amide in benzene is heated at reflux for ten hours. After working up the reaction mixture as in Example 1, a high boiling base, 2-chloro-10-(3'-diethylaminopropyl)-acridan, is obtained.

A solution of 2.0 g. of the base in ether is shaken with a slight excess of phosphoric acid to give the crystalline monophosphate.

Example 12

A suspension of 25.7 g. of 2-chloro-5-ethyl-5-methylacridan (prepared by reacting 2-chloro-5-methylacridine with ethyl magnesium iodide following the procedure of Example 7), 13.3 g. of 3-chloro-1-dimethylamino propane and 4.0 g. of sodium amide in 300 ml. of benzene is heated at reflux for 15 hours. The reaction mixture is worked up following the procedure of Example 1 to give 2 - chloro-10-(3'-dimethylaminopropyl)-5-ethyl-5-methylacridan.

The base is dissolved in ether and the resulting solution is saturated with gaseous hydrogen bromide to give crystals of 2-chloro-10-(3'-dimethylaminopropyl)-5-ethyl-5-methylacridan hydrobromide.

Example 13

A suspension of 16.2 g. of 10-(3'-chloropropyl)-2-trifluoromethylacridan (prepared by condensing 2-trifluoromethylacridan with 3-bromopropyl chloride), 7.5 g. of sodium iodide and 20.0 of piperazine in 300 ml. of a butanonebutyl ether mixture is heated at reflux for 12 hours. The filtered solution is washed with water and extracted with several parts of dilute hydrochloric acid. The acid extracts are neutralized with solid sodium carbonate, and extracted into benzene and ether. The dried organic extracts are combined and evaporated in vacuo. The residue is distilled to give 10-(3'-piperazinylpropyl)-2-trifluoromethylacridan.

Example 14

A mixture of 5.7 g. of 10-(3'-piperazinylpropyl)-2-trifluoromethylacridan, 2.7 g. of 2-bromo-2'-hydroxyethyl ether and 3.0 g. of sodium carbonate in 150 ml. of isopropanol is heated at reflux with stirring for 24 hours. The mixture is filtered and the filtrate is evaporated in vacuo. The residue is taken up in ether. The clear ether solution is saturated with hydrogen chloride gas to give, after several recrystallizations from alcohol-ether mixture, 10-[3'-(4''-hydroxyethoxylethyl-1''-piperazinyl)-propyl]-2-trifluoromethylacridan didhydrochloride.

Example 15

A solution of 9.6 g. of 2-fluoroacridan (prepared by reducing 22.7 g. of 5-chloro-2-fluoroacridine with sodium amalgam in the presence of sodium bicarbonate as in Example 1), 10.0 g. of 3-chloro-2-methyl-1-(N-methylpiperazinyl)-propane and 1.5 g. of sodium amide in 150 ml. of benzene is heated at reflux with stirring for 15 hours. After working up the reaction mixture following the procedure of Example 1, a basic oil, 2-fluoro-10-[2'-methyl-3'-(N-methylpiperazinyl)-propyl]-acridan, is isolated.

A solution of 2.0 g. of the base in ethyl acetate is reacted with an excess of maleic acid in acetone solution to give the dimaleate salt of 2-fluoro-10-[2'-methyl-3'-(N-methylpiperazinyl)-propyl]-acridan.

Example 16

A solution of 21.5 g. of 2-chloroacridan, 21.0 g. of 3-chloro - 2-methyl-1-(N-methylpiperazinyl)-propane and 4.0 g. of sodium amide in 250 ml. of benzene is heated at reflux with stirring for 15 hours. Working up the reaction mixture as described in Example 1 yields 2-chloro-10-[2'-methyl-3'-(N-methylpiperazinyl)-propyl]-acridan.

Reaction of the free base with maleic acid in ethyl acetate solution gives the corresponding dimaleate salt.

Example 17

A suspension of 2.6 g. of 5-methyl-2-trifluoromethylacridan, prepared by the reduction of 5-methyl-2-trifluoromethylacridine obtained from Example 7 as a by-product, 2.0 g. of 3-chloro-1-dibutylamino-2-methylpropane and 0.6 g. of sodium amide in 50 ml. of benzene is heated at reflux for 12 hours. After working up as in Example 1, the hydrochloride salt of 10-(3'-dibutylamino-2'-methylpropyl)-5-methyl-2-trifluoromethylacridan is obtained.

Example 18

A suspension 11.0 g. of 2-chloroacridan, 5.0 g. of 3-chloro-1-dibutylamino-2-methylpropane and 1.5 g. of sodium amide in 50 ml. of benzene is heated at reflux for 12 hours. After working up as in Example 1, the hydrochloride salt of 2-chloro-10-(3'-dibutylamino-2'-methylpropyl)-acridan is obtained.

Example 19

A suspension of 6.5 g. of 2-chloroacridan, 1.2 g. of sodium amide and 5.8 g. of 3-chloro-1-(N-methylpiperazinyl)-propane in 200 ml. of toluene is refluxed for six hours with stirring. The cooled reaction mixture is worked up as described in Example 2 to give 2-chloro-10-[3'-(N-methylpiperazinyl)-propyl]-acridan.

Example 20

A suspension of 6.1 g. of 2-chloro-5,5-dimethylacridan (prepared from reacting 11.5 g. of 2-chloroacridone with an excess of methyl magnesium iodide in butyl ether following the procedure of Example 7), 4.5 g. of 3-bromo-1-dimethylaminopropane and 1.5 g. of sodium amide in 100 ml. of toluene is heated at reflux for three hours. After working up the reaction mixture following the procedure of Example 1, the crystalline salt, 2-chloro-5,5-dimethyl - 10-(3'-dimethylaminopropyl)-acridan hydrochloride is recovered.

Example 21

A suspension of 2.2 g. of 2-chloroacridan, 1.5 g. of 3-chloro-1-dimethylamino-2-methylpropane and 0.5 g. of sodium amide in 100 ml. of benzene is heated at reflux for 15 hours. Ater working up as in Example 1, crystals of 2 -chloro-10-(3'-dimethylamino-2'-methylpropyl)-acridan hydrochloride are recovered.

Example 22

A suspension of 3.3 g. of 2-chloro-5,5-dibutyl acridan (prepared by reacting 2-chloroacridone with an excess of butyl magnesium iodide in butyl ether following the procedure of Example 7), 1.3 g. of 3-chloro-1-(N-methylpiperazinyl)-propane and 0.4 g. of sodium amide in 125 ml. of toluene is refluxed for eight hours with stirring. Working up the reaction mixture as in Example 2 yields 2 - chloro-5,5-dibutyl-10-[3' (N-methylpiperazinyl)-propyl]-acridan.

Example 23

A suspension of 26.0 g. of 2-bromoacridan (prepared by reducing 5-chloro-2-bromoacridine with sodium amalgam in the presence of sodium bicarbonate as in Example 1) and 4.0 g. of sodium amide in 200 ml. of benzene is heated at reflux briefly. A solution of 13.5 g. of 3-chloro-1-dimethyl-aminopropane in 50 ml. of benzene is added and the reflux period is extended for 18 hours. The reaction mixture is cooled, washed carefully with 100 ml. of water and extracted with dilute hydrochloric acid. The acid extracts are made alkaline with ammonia water and extracted with ether. After evaporation of the ether, the residue is distilled to give 2-bromo-10-(3'-dimethylaminopropyl)-acridan.

Example 24

A suspension of 6.2 g. of 2-trifluoromethylacridan, 0.5 g. of sodium amide and 3.0 g. of 3-chloro-1-dimethylaminopropane in 100 ml. of benzene is heated at reflux for 18 hours. The reaction mixture is worked up as in Example 1 to give the base as an oil and the hydrochloride as crystals of 10-(3'-dimethylaminopropyl)-2-trifluoromethylacridan.

This application is a continuation-in-part of application Serial No. 634,155, filed January 15, 1957, now abandoned.

It is not desired to be limited except as set forth in the following claims.

What is claimed is:

1. A chemical compound of the class consisting of a free base and its nontoxic acid addition salts, said free base having the formula:

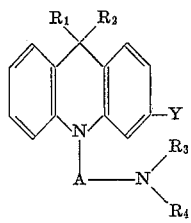

in which Y is a member selected from the group consisting of halogen having an atomic weight of less than 80 and trifluoromethyl; $R_1$ and $R_2$ are members selected from the group consisting of hydrogen and lower alkyl; A is an alkylene chain of from 3 to 5 carbon atoms with a minimum of 3 carbon atoms separating the two nitrogen atoms to which it is attached; and $R_3$ and $R_4$, when individual radicals, are lower alkyl groups and, when taken together, are divalent groups which, together with the nitrogen to which they are attached, form a moiety selected from the group consisting of piperazinyl, lower alkylpiperazinyl, ω-hydroxy-lower-alkylpiperazinyl, ω-hydroxy-lower-alkoxy-lower-alkylpiperazinyl, ω-acetoxy-lower-alkylpiperazinyl, pyrrolidinyl, morpholinyl and piperidinyl; each of the said lower alkyl and lower alkoxy moieties having from 1 to 4 carbon atoms.

2. A chemical compound having the formula:

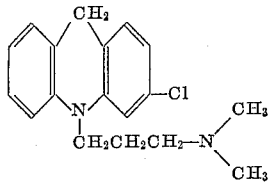

3. A chemical compound having the formula:

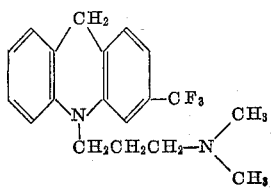

4. A chemical compound having the formula:

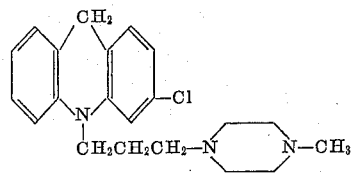

5. A chemical compound having the formula:

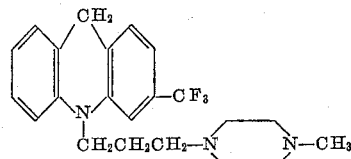

6. A chemical compound having the formula:

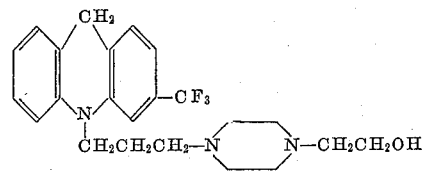

7. A chemical compound having the formula:

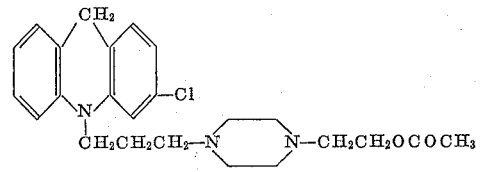

8. A chemical compound having the formula:

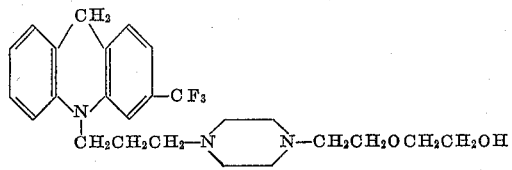

References Cited in the file of this patent

UNITED STATES PATENTS

| | | |
|---|---|---|
| 2,099,826 | Schaffer et al. | Nov. 23, 1937 |
| 2,534,237 | Cusic | Dec. 19, 1950 |
| 2,586,370 | Mills | Feb. 19, 1952 |
| 2,645,640 | Charpentier | July 14, 1953 |
| 2,676,966 | Cusic et al. | Apr. 27, 1954 |
| 2,687,414 | Cusic | Aug. 24, 1954 |
| 2,766,235 | Cusic | Oct. 9, 1956 |
| 2,830,987 | Gailliot et al. | Apr. 15, 1958 |
| 2,902,484 | Horclois | Sept. 1, 1959 |
| 2,921,069 | Ullyot | Jan. 12, 1960 |

FOREIGN PATENTS

| | | |
|---|---|---|
| 549,299 | Belgium | Jan. 5, 1957 |
| 1,176,934 | France | Dec. 1, 1958 |
| 957,573 | Germany | Feb. 7, 1957 |
| 793,088 | Great Britain | Apr. 9, 1958 |

OTHER REFERENCES

Freeze et al.: Federation Proceedings, vol. 7, page 219 (1948).